(12) United States Patent
Nishi et al.

(10) Patent No.: US 9,656,868 B2
(45) Date of Patent: May 23, 2017

(54) BORON-NITRIDE POWDER AND RESIN COMPOSITION CONTAINING SAME

(71) Applicant: DENKI KAGAKU KOGYO KABUSHIKI KAISHA, Tokyo (JP)

(72) Inventors: Taiki Nishi, Omuta (JP); Koki Ikarashi, Omuta (JP); Toshikatsu Mitsunaga, Omuta (JP)

(73) Assignee: DENKA COMPANY LIMITED, Tokyo (JP)

( * ) Notice: Subject to any disclaimer, the term of this patent is extended or adjusted under 35 U.S.C. 154(b) by 104 days.

(21) Appl. No.: 14/773,264

(22) PCT Filed: Mar. 7, 2014

(86) PCT No.: PCT/JP2014/056034
§ 371 (c)(1),
(2) Date: Sep. 4, 2015

(87) PCT Pub. No.: WO2014/136959
PCT Pub. Date: Sep. 12, 2014

(65) Prior Publication Data
US 2016/0060112 A1    Mar. 3, 2016

(30) Foreign Application Priority Data
Mar. 7, 2013   (JP) ................. 2013-044900

(51) Int. Cl.
*C08K 3/38*    (2006.01)
*C01B 21/064*  (2006.01)
(Continued)

(52) U.S. Cl.
CPC ........ *C01B 21/064* (2013.01); *C01B 21/0648* (2013.01); *C08K 3/38* (2013.01);
(Continued)

(58) Field of Classification Search
CPC ..... C01B 21/064; C01B 21/0648; C08K 3/38; C08K 2003/382; C08K 2003/385
See application file for complete search history.

(56) References Cited

U.S. PATENT DOCUMENTS 6,645,612 B2 * 11/2003 Pujari .................. C01B 21/064
                                                     257/717
9,029,438 B2 *  5/2015 Yamamoto ............... C08K 3/10
                                                     523/445
(Continued)

FOREIGN PATENT DOCUMENTS

CN    1194960 A    10/1998
CN    1839096 A     9/2006
(Continued)

OTHER PUBLICATIONS

Machine translated English language equivalent of JP 2010-157563 (Jul. 2010, 10 pages).*
(Continued)

*Primary Examiner* — Brieann R Fink
(74) *Attorney, Agent, or Firm* — Stein IP, LLC

(57) ABSTRACT

Provided is a boron-nitride powder that is suitable for use in a resin composition for transmitting heat from a heat-producing electronic component such as a power device to a heat-dissipating member. The boron-nitride powder reduces thermal-conductivity anisotropy and thermal contact resistance, resulting in high thermal conductivity, and contains boron-nitride particles each consisting of hexagonal boron-nitride primary particles joined together. The boron-nitride powder, which is an aggregate of said boron-nitride particles, exhibits a mean sphericity of at least 0.70, a mean particle diameter of 20-100 µm, a porosity of 50-80%, a mean pore diameter of 0.10-2.0 µm, a maximum pore diameter of at most 10 µm, and a calcium content of 500-5,000 ppm. Under X-ray powder diffraction, the graphi-
(Continued)

tization index of the boron-nitride powder is preferably between 1.6 and 4.0, inclusive, and the peak intensity ratio (I(002)/I(100)) between the (002) plane and the (100) plane is preferably at most 9.0.

9 Claims, 1 Drawing Sheet

(51) Int. Cl.
C08L 101/00 (2006.01)
C09K 5/14 (2006.01)
(52) U.S. Cl.
CPC ............ *C08L 101/00* (2013.01); *C09K 5/14* (2013.01); *C01P 2002/74* (2013.01); *C01P 2002/76* (2013.01); *C01P 2004/03* (2013.01); *C01P 2004/32* (2013.01); *C01P 2004/50* (2013.01); *C01P 2004/61* (2013.01); *C01P 2006/14* (2013.01); *C01P 2006/16* (2013.01); *C01P 2006/32* (2013.01); *C01P 2006/80* (2013.01); *C08K 2003/385* (2013.01)

(56) References Cited

U.S. PATENT DOCUMENTS

| | | | | |
|---|---|---|---|---|
| 9,516,741 B2* | 12/2016 | Hirotsuru | ............. | H05K 1/0353 |
| 2001/0021740 A1 | 9/2001 | Lodyga et al. | ................ | 524/428 |
| 2003/0073769 A1 | 4/2003 | Pujari et al. | .................. | 524/404 |
| 2006/0127422 A1* | 6/2006 | Lodyga | ............. | C04B 35/58007 |
| | | | | 424/400 |
| 2008/0153960 A1 | 6/2008 | Meneghetti et al. | ......... | 524/404 |
| 2010/0226095 A1 | 9/2010 | Mimura et al. | ............... | 361/707 |
| 2011/0147064 A1 | 6/2011 | Pruss et al. | .................... | 174/260 |
| 2011/0290468 A1 | 12/2011 | Nakayama et al. | ............ | 165/185 |
| 2012/0141348 A1 | 6/2012 | Yoshihara et al. | ............ | 423/290 |
| 2012/0196128 A1 | 8/2012 | Gohara et al. | ................ | 428/402 |
| 2014/0349105 A1* | 11/2014 | Yamazaki | .......... | C08G 59/4042 |
| | | | | 428/323 |

FOREIGN PATENT DOCUMENTS

| | | | | |
|---|---|---|---|---|
| CN | 101003436 A | 7/2008 | | |
| CN | 101535176 A | 9/2009 | | |
| CN | 102300949 A | 12/2011 | | |
| EP | 2 487 134 A1 | 8/2012 | | |
| JP | H 9-202663 A | 8/1997 | | |
| JP | H 2000-154265 A | 6/2000 | | |
| JP | 2001-122615 A | 5/2001 | | |
| JP | 2010-157563 A | 7/2010 | | |
| JP | 2010157563 A * | 7/2010 | | |
| JP | 2011-98882 A | 5/2011 | | |
| JP | 2012-171842 A | 9/2012 | | |
| JP | WO 2013081061 A1 * | 6/2013 | ......... | C08G 59/4042 |
| JP | 2014-40341 A | 3/2014 | | |
| WO | EP 1 053 973 A1 | 5/2000 | | |
| WO | WO 2012/070289 A1 | 5/2012 | | |

OTHER PUBLICATIONS

Chinese Office Action dated Sep. 5, 2016, issued by the Chinese Patent Office in corresponding application CN 201480012728.4.
PolarTherm Boron Nitride Powder PTX25 and PTX60, Sep. 1, 2016.
Extended European Search Report issued by the European Patent Office, dated Oct. 6, 2016 in corresponding application 14760169.4.
Taiwanese Office Action dated Dec. 4, 2014, issued to Taiwanese Application No. 103107862.
International Search Report dated Jun. 10, 2014, issued to International Application No. PCT/JP2014/056034.

* cited by examiner

BORON-NITRIDE POWDER AND RESIN COMPOSITION CONTAINING SAME

CROSS-REFERENCE TO RELATED APPLICATIONS

This application is a national stage of International Application No. PCT/JP2014/056034, filed Mar. 7, 2014, which claims the benefit of priority to Japanese Application No. 2013-044900, filed Mar. 7, 2013, in the Japanese Patent Office, the disclosures of which are incorporated herein by reference.

TECHNICAL FIELD

The present invention relates to a boron-nitride powder and a resin composition containing the same. Specifically, the present invention is suitably used as a resin composition for transmitting heat from a heat-producing electronic component such as a power device to a heat-dissipating member. In particular, the present invention relates to a boron-nitride powder which is filled into a resin composition for a thermal interface material or insulating layer for a printed circuit board, to exhibit high thermal conductivity, and a resin composition containing the same.

BACKGROUND ART

In the heat-producing electronic components such as the power device, a transistor, a thyristor, a CPU or the like, it has been an importance issue how efficiently to dissipate heat generated during use thereof. Conventionally, as such heat dissipation measures, the followings have been generally performed, (1) an insulating layer for a printed circuit board mounted with a heat-producing electronic component is made to have high thennal conductivity, (2) the heat-producing electronic component or the printed circuit board mounted with the heat-producing electronic component is attached to the heat-dissipating member such as a heat sink via an electrically insulating thermal interface material. As the resin composition for the thermal interface material or insulating layer for the printed circuit board, a silicone resin or epoxy resin filled with ceramic powders having high thermal conductivity is used.

In recent years, with rapid development of high-density mounting technology accompanying miniaturization of electronic devices, increase in speed and integration density of circuit inside the heat-producing electronic component, and increase in packing density of the heat-producing electronic component on the printed circuit board are in progress. Therefore, heat generation density inside the electronic devices has been increasing year by year, and a ceramic powder exhibiting higher thermal conductivity than ever has been required.

Under the background described above, hexagonal boron-nitride powder having excellent properties such as (1) high thermal conductivity, (2) high insulation property, and (3) low relative permittivity, as an electrical insulating material, has been attracting attention. However, a hexagonal boron-nitride particle has a thermal conductivity of 2 W/(m·K) in a thickness direction (c-axis direction), while a thermal conductivity thereof in an in-plane direction (a-axis direction) is 400 W/(m·K), and a thermal-conductivity anisotropy derived from a crystal structure and scale-shape is large (Non-Patent Document 1). Further, when the hexagonal boron-nitride powder is filled in a resin, the particles are all aligned in the same direction. Therefore, for example, during production of the thermal interface material, the in-plane direction (a-axis direction) of the hexagonal boron-nitride particle is perpendicular to a thickness direction of the thermal interface material, and thus high thermal conductivity in the in-plane direction (a-axis direction) of the hexagonal boron-nitride particle cannot be fully exploited.

In order to solve such a problem, Patent Document 1 proposes that the in-plane direction (a-axis direction) of the hexagonal boron-nitride particle is oriented in a thickness direction of a high thermal conductivity sheet. According to a technology proposed in Patent Document 1, it is possible to exploit high thermal conductivity in the in-plane direction (a-axis direction) of the hexagonal boron-nitride particle. However, the technology proposed in Patent Document 1 has problems that (1) it is necessary to stack oriented sheets in a next step, and thus a production process easily becomes complicated, and (2) it is necessary to cut the sheet into thin sheets after lamination and curing, and thus it is difficult to ensure dimensional accuracy in thickness of the sheet. Further, in the technology proposed in Patent Document 1, since the hexagonal boron-nitride particle is scale-shaped, viscosity is increased and fluidity is reduced at the time of being filled into the resin, and thus high density filling of the particles is difficult. In order to improve the problems, the hexagonal boron-nitride powders of various shapes, which have reduced thermal-conductivity anisotropy of the hexagonal boron-nitride particle, have been proposed.

For example, Patent Documents 2 and 3 propose to use the hexagonal boron-nitride powder which is aggregated so that hexagonal boron-nitride primary particles are not oriented in the same direction. According to a technology proposed in Patent Documents 2 and 3, it is possible to reduce the thermal-conductivity anisotropy. However, in the technology proposed in Patent Documents 2 and 3, the aggregated hexagonal boron-nitride powder has a pinecone shape (for example, see Patent Document 2: paragraph [0020] and FIG. 6) or a massive form (for example, see Patent Document 3: paragraph [0037] and FIGS. 3 to 5), and a mean sphericity thereof is small, and thus there is a limit to filling into the resin, and there is a limit to improvement of the thermal conductivity.

Further, Patent Document 4 proposes to use the hexagonal boron-nitride powder, which is borate particle coated with the hexagonal boron-nitride particle and has a high mean sphericity. According to a technology proposed in Patent Document 4, it is possible to obtain a certain effect for improving filling property into the resin and for reducing the theiinal-conductivity anisotropy. However, in the technology proposed in Patent Document 4, since the content rate of the borate particles having low thermal conductivity is high (for example, see paragraphs [0020], [0028]), there is a problem that it is not possible to fully take advantage of high thermal conductivity of the hexagonal boron-nitride particle.

Further, it is known that the thermal conductivity of the epoxy resin or the silicone resin is much lower than the thermal conductivity in the in-plane direction (a-axis direction) of the hexagonal boron-nitride particle. Therefore, the thermal conductivity of the resin composition, which is the resin filled with the boron-nitride particles of reduced thermal-conductivity anisotropy, is greatly affected by thermal contact resistance of interface between the resin and the boron-nitride particles. That is, in order to obtain the resin composition having high thermal conductivity, it is necessary to reduce the thermal-conductivity anisotropy of the boron-nitride particles, and to reduce the thermal contact resistance of the interface between the resin and the boron-nitride particles.

As a method for reducing the thermal contact resistance of the interface between the resin and the boron-nitride particles, it can be mentioned to (1) increase a mean particle diameter of the boron-nitride particles (reduce a total number of interfaces between the resin and the boron-nitride particles), (2) improve conformability between the resin and the boron-nitride particles by adding a silane coupling agent, and (3) bring the boron-nitride particles into surface contact with each other, however, an effect of (3) is greatest.

For example, Patent Documents 5 and 6 propose boron-nitride particles formed by isotropic aggregation of the hexagonal boron-nitride primary particles, and a thermally conductive sheet formed by dispersion of the boron-nitride particles in a thermosetting resin. According to the technology proposed in Patent Documents 5 and 6, it is possible to obtain a certain effect for improving filling property in the resin and for reducing the thermal-conductivity anisotropy. However, in the technology proposed in Patent Documents 5 and 6, since it does not consider reduction in the thermal contact resistance owing to the surface contact between the boron-nitride particles, there is a problem that it is not possible to fully take advantage of high thermal conductivity of the hexagonal boron-nitride particle.

Further, Patent Document 7 proposes a thermally conductive sheet characterized in that secondary particles composed of the boron-nitride primary particles are in surface contact. According to a technology proposed in Patent Document 7, it is possible to obtain a certain effect for reducing the thermal-conductivity anisotropy, for improving filling property in the resin, and for reducing the thermal contact resistance. However, Patent Document7 does not disclose to mix a sintering aid required for bonding the hexagonal boron-nitride primary particles (for example, paragraph [0017]), and a technology proposed in Patent Document 7 shows that porosity is less than or equal to 50 vol % (for example, paragraph [0014]), and thus it is difficult to obtain both easiness of deformation (low elastic modulus) and improvement in strength of the secondary particles. As a result, in the technology proposed in Patent Document 7, there is a limit to the improvement of the thermal conductivity by reducing the thermal contact resistance, and further technical development has been awaited.

PRIOR ART DOCUMENT

Patent Literature

[Patent Document 1]
Japanese Patent Application Publication No. 2000-154265
[Patent Document 2]
Japanese Patent Application Publication No. H09-202663
[Patent Document 3]
Japanese Patent Application Publication No. 2011-098882
[Patent Document 4]
Japanese Patent Application Publication No. 2001-122615
[Patent Document 5]
Japanese Patent Application Publication No. 2010-157563
[Patent Document 6]
Japanese Patent Application Publication No. 2012-171842

[Patent Document 7]
International Publication No. WO2012/070289

Non-Patent Literature

[Non-Patent Document 1]
R. F. Hill, P. H. Supancic, J. Am. Ceram. Soc., 85, 851 (2002)

SUMMARY OF INVENTION

Problem to be Solved by Invention

In view of the above prior art, a purpose of the present invention is to provide a boron-nitride powder and a resin composition containing the same. The boron-nitride powder is suitable for use in the resin composition for transmitting heat from the heat-producing electronic component such as the power device to the heat-dissipating member, and in particular, is useful in the resin composition for the thermal interface material or insulating layer for the printed circuit board. Furthermore, the boron-nitride powder exhibits high thermal conductivity by reducing the thermal-conductivity anisotropy and by reducing the thermal contact resistance.

Means to Solve Problem

In order to solve the above problems, the present invention employs the following solutions.

(1) A boron-nitride powder, containing boron-nitride particles each composed of hexagonal boron-nitride primary particles joined together, which is an aggregate of the boron-nitride particles, characterized in that the boron-nitride powder has a mean sphericity of 0.70 or more, a mean particle diameter of 20 to 100 µm, a porosity of 50 to 80%, a mean pore diameter of 0.10 to 2.0 µm, a maximum pore diameter of 10 µm or less, and a calcium content of 500 to 5,000 ppm.

(2) The boron-nitride powder according to the above (1), characterized in that a graphitization index measured by powder X-ray diffraction method is 1.6 to 4.0, and a peak intensity ratio I(002)/I(100) of (002) plane to (100) plane is 9.0 or less.

(3) The boron-nitride powder according to the above (1), characterized in that amorphous boron-nitride having a mean particle diameter of 2 to 6 µm and the hexagonal boron-nitride having a mean particle diameter of 8 to 16 µm are used as raw materials, and a mixing ratio thereof, that is, the ratio of the amorphous boron-nitride to the hexagonal boron-nitride is 60:40 to 90:10 on a mass basis.

(4) A resin composition characterized by containing a resin and the boron-nitride powder according to any one of the above (1) to (3).

(5) The resin composition according to the above (4), characterized in that an elastic modulus of the boron-nitride particles is 5 to 35 MPa, and the boron-nitride particles are in surface contact with each other.

Advantageous Effects of Invention

The boron-nitride powder of the present invention is for obtaining both improvement in particle strength of the boron-nitride particles and improvement in easiness of deformation (low elastic modulus) of the particles. Therefore, according to the boron-nitride powder of the present invention, it is possible to reduce the thermal-conductivity anisotropy and to reduce the thermal contact resistance, thereby exhibiting high thermal conductivity. Further, since the resin composition containing the boron-nitride powder of the present invention contains the above-described boron-nitride powder of the present invention, it is possible to exhibit high thermal conductivity.

EMBODIMENTS FOR CARRING OUT INVENTION

Figure 1:
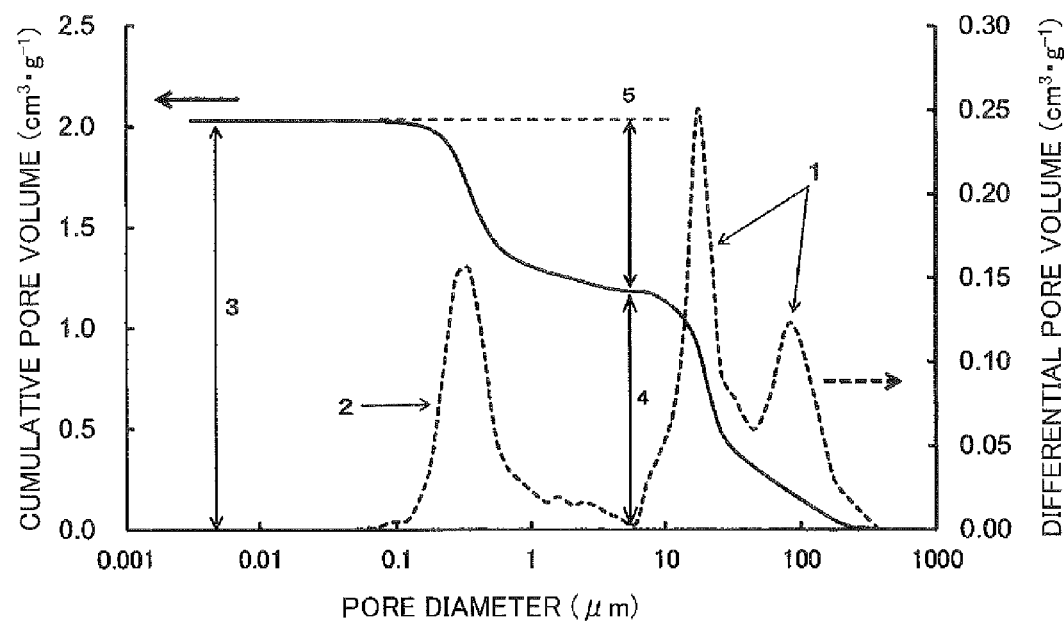
FIG. 1 is an example of measurement results of maximum pore diameter, mean pore diameter, and porosity of a boron-nitride powder of the present invention. Note that in FIG. 1, the horizontal axis indicates a pore diameter (μm), the left vertical axis indicates a cumulative pore volume (cm$^3$·g$^{-1}$), and the right vertical axis indicates a differential pore volume (cm$^3$·g$^{-1}$).

<Definition of Terms for Hexagonal Boron-Bitride Particle and Boron-Nitride Particles>

In the present invention, a primary particle is defined as a "hexagonal boron-nitride particle", and primary particles aggregated two or more in a state of being bonded to each other by sintering is defined as "boron-nitride particles". An aggregate of "boron-nitride particles" is defined as a "boron-nitride powder". Bonding between the primary particles by sintering can be evaluated by observing that a continuous structure is formed in a bonding portion between the primary particles in a cross-section of the boron-nitride particles by using a scanning electron microscope (for example, "JSM-6010LA" (manufactured by JEOL Ltd.)). A case where the primary particles are bonded by sintering is defined as a case where the continuous structure is formed at points of 50% or more when observing bonding portions between the primary particles.

Observation points are set to arbitrary 100 points. As a pretreatment for observation, after embedding the boron-nitride particles in the resin, the resin is processed by CP (cross-section polisher) method, and osmium coating is performed after the resin is fixed to a sample stage. Observation magnification is 1000 times.

Since the boron-nitride powder of the present invention has specific calcium content, porosity, mean pore diameter, maximum pore diameter, mean sphericity, mean particle diameter, crystallinity and orientation, it is possible to obtain excellent boron-nitride powder having both particle strength of the boron-nitride particles and easiness of deformation (low elastic modulus) of the particles, which are not achieved in the prior art. Further, since a resin composition containing the boron-nitride powder of the present invention can reduce thermal contact resistance, it is possible to exhibit high thermal conductivity not achieved in the prior art.

The boron-nitride powder of the present invention has a mean sphericity of 0.70 or more, a mean particle diameter of 20 to 100 μm, a porosity of 50 to 80%, a mean pore diameter of 0.10 to 2.0 μm, a maximum pore diameter of 10 μm or less, and a calcium content of 500 to 5,000 ppm. Further, a graphitization index of the boron-nitride powder of the present invention, measured by powder X-ray diffraction method is preferably 1.6 to 4.0, and a peak intensity ratio I(002)I(100) of (002) plane to (100) plane is preferably 9.0 or less. In order to obtain the resin composition having high thermal conductivity, it is a very important factor to ensure particle strength and easiness of deformation (low elastic modulus) at the time of surface contact between the boron-nitride particles, that is, easiness of the surface contact between the boron-nitride particles. The particle strength can withstand shear stress of kneading at the time of being filled in the resin and compressive stress at the time of surface contact between the boron-nitride particles (especially during hot press molding). The boron-nitride powder designed according to the present invention does not exist so far.

<Calcium Content and Evaluation Method Thereof>

In the boron-nitride powder of the present invention, it is particularly important to have a calcium content of 500 to 5,000 ppm. When the calcium content is less than 500 ppm, bonding between the primary particles by sintering is insufficient, and it is not possible to obtain particle strength to withstand shear stress of kneading at the time of being filled in the resin and compressive stress at the time of surface contact between the boron-nitride particles (especially during hot press molding). When the calcium content is more than 5,000 ppm, since an elastic modulus of the boron-nitride particles is high, the surface contact between the boron-nitride particles is insufficient, and the thermal conductivity of the resin composition is reduced. The calcium content is preferably 1,000 to 3,000 ppm. The calcium content can be measured by using, for example, a wavelength dispersive fluorescent X-ray analyzer "ZSX PrimusII" (manufactured by Rigaku Corporation). As a pretreatment, the boron-nitride powder is press-molded. During the measurement, a Rh tube is used as an X-ray tube, while X-ray tube power is 3.0 kW, and measured diameter Φ=30 mm <Porosity>

The boron-nitride powder of the present invention has a porosity of 50 to 80%. When the porosity is less than 50%, since the elastic modulus of the boron-nitride particles is high, the surface contact between the boron-nitride particles is insufficient, and the thermal conductivity of the resin composition is reduced. When the porosity exceeds 80%, since the particle strength of the boron-nitride particles is reduced, a spherical structure is destroyed by compressive stress at the time of surface contact between the boron-nitride particles, and by shear stress at the time of being kneaded in the resin, and hexagonal boron-nitride primary particles are oriented in the same direction.

<Evaluation Method of Porosity>

The porosity is a value determined by measuring a total pore volume with a mercury porosimeter in accordance with JIS R 1655. The total pore volume using the mercury porosimeter can be measured by using, for example, "PASCAL 140-440" (manufactured by Fisons Instruments, Inc.). The principle of this measurement is based on a formula $\epsilon_g = V_g/(V_g+1/\rho_t) \times 100$. In the formula, $E_g$ is the porosity (%) of the boron-nitride particles, $V_g$ is a cumulative pore volume (cm$^3$/g) of intra-particle voids 2 (see reference numeral 5 in FIG. 1), and $\rho_t$ is a density (2.34 g/cm$^3$) of the hexagonal boron-nitride primary particles. Note that, $V_g$ can be determined as a value obtained by subtracting a cumulative pore volume (see reference numeral 4 in FIG. 1) of inter-particle voids 1 from a total pore volume 3 (see FIG. 1). An example of measurement results is shown in FIG. 1.

<Mean Pore Diameter>

The boron-nitride powder of the present invention has a mean pore diameter of 0.10 to 2.0 μm. When the mean pore diameter is greater than 2.0 μm, it is not possible to obtain the particle strength to withstand shear stress of kneading at the time of being filled in the resin and compressive stress at the time of surface contact between the boron-nitride particles. When the mean pore diameter is smaller than 0.10 μm, since the elastic modulus of the boron-nitride particles is high, the surface contact between the boron-nitride particles is insufficient, and the thermal conductivity of the resin composition is reduced.

<Evaluation Method of Mean Pore Diameter>

The mean pore diameter is a value determined by measuring the total pore volume with the mercury porosimeter in accordance with JIS R 1655. The total pore volume using the mercury porosimeter can be measured by using, for example, "PASCAL 140-440" (manufactured by Fisons Instruments, Inc.). In FIG. 1, the mean pore diameter is a pore diameter when a value obtained by subtracting the inter-particle voids 1 (see FIG. 1) from the cumulative pore volume is 50% of Vg (the value obtained by subtracting the cumulative pore volume (see reference numeral 4 in FIG. 1) of the inter-particle voids 1 from the total pore volume 3).

<Maximum Pore Diameter>

The boron-nitride powder of the present invention has a maximum pore diameter of 10 μm or less. When the maximum pore diameter is greater than 10 μm, it is not possible to obtain the particle strength to withstand shear stress of kneading at the time of being filled in the resin and compressive stress at the time of surface contact between the boron-nitride particles. The lower limit is not particularly limited, however, it is difficult to completely equalize the pore diameter because particle diameter of the hexagonal boron-nitride primary particles is distributed, and thus the lower limit is practically about twice the mean pore diameter.

<Evaluation Method of Maximum Pore Diameter>

The maximum pore diameter is a value determined by measuring the total pore volume with the mercury porosimeter in accordance with JIS R 1655. The total pore volume using the mercury porosimeter can be measured by using, for example, "PASCAL 140-440" (manufactured by Fisons Instruments, Inc.). In FIG. 1, the maximum pore diameter is a pore diameter when the value obtained by subtracting the inter-particle voids 1 (see FIG. 1) from the cumulative pore volume is 0.

<Mean Sphericity>

The boron-nitride powder of the present invention has a mean sphericity of 0.70 or more. When the mean sphericity is less than 0.70, frictional resistance between the resin and the boron-nitride surface is high when kneading the boron-nitride powder in the resin. Therefore, viscosity of the resin composition is high, and it is difficult to highly fill the boron-nitride powder in the resin. The upper limit is not particularly limited, however, it is difficult to have a mean sphericity of 1.0 because the hexagonal boron-nitride primary particles are scale-shaped, and the upper limit is practically about 0.98.

<Definition and Evaluation Method of Mean Sphericity>

The mean sphericity can be measured in the following manner, by photographing the boron-nitride powder fixed to a conductive double-sided tape on a sample stage with a scanning electron microscopy, for example, "JSM-6010LA" (manufactured by JEOL Ltd.), and by capturing the obtained image of the particles in an image analysis software, for example, "A zou (picture) kun" (Asahi Kasei Engineering Corporation). A perimeter (PM) and a projected area (A) of the particle are measured from the photograph. When an area of a true circle corresponding to the perimeter (PM) is assumed to be (B), the circularity of the particle can be represented as A/B. Therefore, when assuming a true circle having the same perimeter with the perimeter (PM) of the sample particle, $B=\pi \times (PM/2\pi)^2$ because $PM=2\pi r$, $B=\pi r^2$, and thus the sphericity of the individual particles can be calculated by an equation: sphericity=$A/B=A \times 4\pi/(PM)^2$. Magnification of the image is 100 times and the number of pixels of the analyzed image is 15.1 million pixels in this case. By determining the sphericities of arbitrary 100 particles in this manner, a mean value thereof is defined as a mean sphericity.

<Mean Particle Diameter>

The boron-nitride powder of the present invention has a mean particle diameter of 20 to 100 μm. When the mean particle diameter is smaller than 20 μm, the thermal conductivity is reduced by an increase in the thermal contact resistance associated with an increase in the total number of interfaces between the resin and the boron-nitride particles. When the mean particle diameter is greater than 100 μm, since the particle strength of the boron-nitride particles is reduced, the spherical structure is destroyed by shear stress at the time of being kneaded in the resin, and the hexagonal boron-nitride primary particles are oriented in the same direction.

<Definition and Evaluation Method of Mean Particle Diameter>

The mean particle diameter is a particle diameter when a cumulative value of the particle diameter distribution is 50% in the particle diameter distribution measurement by a laser diffraction light scattering method. The particle diameter distribution can be measured by a particle diameter distribution measuring instrument, for example, "MT3300EX" (manufactured by NIKKISO CO., LTD.). In the measurement, as a pretreatment, the boron-nitride powder is subjected to dispersion treatment using a homogenizer by applying an output of 20 W for 30 seconds, while using water as a solvent, and hexametaphosphate as a dispersant. It is assumed that a refractive index of water is 1.33 and a refractive index of the boron-nitride powder is 1.80. Measurement time per one time is 30 seconds.

<Peak Intensity Ratio I(002)/I(100)>

In the boron-nitride powder of the present invention, it is preferred that the thermal-conductivity anisotropy is reduced, that is, the orientation is small. The orientation can be measured as the ratio I(002)/I(100) which is a ratio of (002) plane diffraction peak intensity I(002) to (100) plane diffraction peak intensity I(100) by the powder X-ray diffraction method. A thickness direction of the hexagonal boron-nitride particle is identical with the crystallographic (002) plane, that is, a c-axis direction, and an in-plane direction thereof is identical with the (100) plane, that is, an a-axis direction, respectively. When the hexagonal boron-nitride primary particles constituting the boron-nitride particles are in completely random orientation (non-orientation), I(002)/I(100) is about 6.7 (Crystal density value [Dx] of "JCPDS [Powder X-ray diffraction database]" No.34-0421 [BN]). I(002)/I(100) of a highly crystalline hexagonal boron-nitride is generally greater than 20. In the boron-nitride powder of the present invention, the peak intensity ratio I(002)/I(100) of the (002) plane to the (100) plane is preferably 9.0 or less. When the peak intensity ratio I(002)/I(100) of the (002) plane to the (100) plane is greater than 9.0, there is a possibility that the thermal conductivity of the resin composition is reduced by the orientation of the hexagonal boron-nitride particle. The lower limit is not particularly limited, however, it is difficult to have the peak intensity ratio I(002)/I(100) of the (002) plane to the (100)

plane of 0.0 because the hexagonal boron-nitride primary particles are scale-shaped, and thus the lower limit is practically about 2.0.

<Evaluation Method of Peak Intensity Ratio I(002)/I(100)>

The orientation, that is, I(002)/I(100) measured by the powder X-ray diffraction method can be measured by using, for example, "D8 ADVANCE Super Speed" (manufactured by Bruker AXS K.K.). As a pretreatment, after the boron-nitride powder is press-molded, X-ray is irradiated symmetrically with respect to a normal of a plane in the in-plane direction of the molded body. During the measurement, a CuKα ray is used as an X-ray source, while a tube voltage is 45 kV and a tube current is 360 mA.

<Graphitization Index (GI)>

The graphitization index can be determined by an integrated intensity ratio of peak of (100) plane, (101) plane and (102) plane in an X-ray diffraction diagram, that is, by an area ratio: GI=[area{(100)+(101)}]/[area (102)] (J. Thomas, et. al, J. Am. Chem. Soc. 84, 4619 (1962)). A fully crystallized boron-nitride is assumed to have GI of 1.60, but in a case of scale-shaped hexagonal boron-nitride powder which is highly crystallized and sufficiently grown, the GI is further small because the particles are easily orientated. That is, the GI is an index of crystallinity of the scale-shaped hexagonal boron-nitride powder, and the crystallinity is high as this value is small. In the boron-nitride powder of the present invention, the GI is preferably 1.6 to 4.0. When the GI is greater than 4.0, the hexagonal boron-nitride primary particles have low crystallinity, and thus it is not possible to obtain high thermal conductivity in some cases. Further, when the GI is smaller than 1.6, it is difficult to maintain the spherical structure in some cases because the scale shape is too grown, and thus there is a possibility that the particle strength is reduced.

<Evaluation Method of Graphitization Index (GI)>

The GI can be measured by using, for example, "D8 ADVANCE Super Speed" (manufactured by Bruker AXS K.K.). As a pretreatment, after obtaining the hexagonal boron-nitride primary particles by crushing the boron-nitride powder, the hexagonal boron-nitride primary particles are press-molded. The X-ray is irradiated symmetrically with respect to the normal of the plane in the in-plane direction of the molded body. During the measurement, the CuKa ray is used as the X-ray source, while the tube voltage is 45 kV and the tube current is 360 mA.

<BN Purity and Evaluation Method Thereof>

In the boron-nitride powder of the present invention, it is preferred that boron-nitride purity (BN purity) is 95 mass % or more. The BN purity can be measured by steam distillation by Kjeldahl method after alkali decomposition of the boron-nitride powder, and by neutralization titration of total nitrogen in the distillate.

<Amorphous Boron-Nitride and Hexagonal Boron-Nitride Powder as Raw Materials>

In the boron-nitride powder of the present invention, the amorphous boron-nitride and the hexagonal boron-nitride powder are used as raw materials. The mean particle diameter of the amorphous boron-nitride is preferably 2 to 6 μm. The mean particle diameter of the hexagonal boron-nitride is preferably 8 to 16 μm.

<Mixing Ratio of Amorphous Boron-Nitride and Hexagonal Boron-Nitride Powder as Raw Materials>

In the boron-nitride powder of the present invention, a mixing ratio of amorphous boron-nitride and hexagonal boron-nitride powder as raw materials is preferably "amorphous boron-nitride":"hexagonal boron-nitride"=60:40 to 90:10 on a mass basis. When the mixing ratio of amorphous boron-nitride is smaller than 60, the porosity of the boron-nitride particles is large, and it is not possible to obtain the particle strength to withstand shear stress of kneading at the time of being filled in the resin and compressive stress at the time of surface contact between the boron-nitride particles (especially during hot press molding). When the mixing ratio of amorphous boron-nitride is greater than 90, it is not possible to obtain easiness of deformation (low elastic modulus).

<Elastic Modulus>

In the boron-nitride powder of the present invention, the elastic modulus of the boron-nitride particles is preferably 5 to 35 MPa. When the elastic modulus of the boron-nitride particles is smaller than 5 MPa, the spherical structure is destroyed by compressive stress at the time of surface contact between the boron-nitride particles (especially during hot press molding), and hexagonal boron-nitride primary particles are oriented in the same direction. Therefore, the thermal-conductivity anisotropy is large. When the elastic modulus of the boron-nitride particles is greater than 35 MPa, the surface contact between the boron-nitride particles is insufficient, and the thermal conductivity of the resin composition is reduced.

<Evaluation Method of Elastic Modulus>

The elastic modulus (E: MPa) of the boron-nitride particles is calculated from test force—displacement curve at the time of particle strength measurement in accordance with JIS R1639-5. As a measuring device, a micro-compression tester (for example, "MCT-W500" manufactured by SHIMADZU CORPORATION) is used. The elastic modulus is calculated using a formula (Tanaka, Physics Research, 85(4), 499-518 (2006)) of $P=(4\times E\times (d/2)^{1/2}\times (Y)^{3/2})/(3\times (1-v^2))$ from crush test force (P: N), particle diameter (d: mm), displacement amount (Y: mm) at the time of collapse and Poisson's ratio (v). Here, Poisson's ratio is assumed to be 0.13.

<Resin Composition Containing Boron-Nitride Powder>

Next, the resin composition containing the boron-nitride powder of the present invention will be described. A ratio of the boron-nitride powder in the resin composition is preferably 20 to 80 vol %. Further, one or more kinds of various ceramic powders having a mean particle diameter smaller than that of the boron-nitride powder of the present invention, for example, aluminum nitride, hexagonal boron-nitride, boron-nitride, silicon nitride, aluminum oxide, zinc oxide, magnesium oxide, magnesium hydroxide, silicon dioxide and silicon carbide powder, may be added as appropriate. A suitable mean particle diameter of the various ceramic powders varies depending on the mean particle diameter of the boron-nitride powder of the present invention. For example, when the mean particle diameter of the boron-nitride powder of the present invention is 50 μm, the mean particle diameter of the various ceramic powders is preferably 20 μm or less, and more preferably 10 μm or less. Since it is possible to make packing structure of the particles denser, filling property is improved, and as a result, it is possible to significantly improve the thermal conductivity of the resin composition.

<Resin>

As the resin used in the resin composition of the present invention, for example, epoxy resin, silicone resin, silicone rubber, acrylic resin, phenolic resin, melamine resin, urea resin, unsaturated polyester, fluorine resin, polyamides such as polyimide, polyamide-imide and polyether imide, polyesters such as polybutylene terephthalate and polyethylene terephthalate, polyphenylene ether, polyphenylene sulfide, wholly aromatic polyester, polysulfone, liquid crystal polymer, polyether sulfone, polycarbonate, maleimide-modified resin, ABS resin, AAS (acrylonitrile-acrylic rubber-styrene) resin, AES (acrylonitrile-ethylene-propylene-diene rubber-styrene) resin, polyglycolic acid resin, polyphthalamide, polyacetal, nylon resin or the like, can be used. These resins, in particular, thermosetting resins can appropriately contain a curing agent, an inorganic filler, a silane coupling agent, and further additives for reducing generation of defects during hot press molding by promoting viscosity reduction and improvement of leveling property and wettability. Such additives are, for example, a defoamer, a surface conditioner, a wetting and dispersing agent and the like. Further, since the epoxy resin has a high heat resistance and a high adhesive strength to a copper foil circuit, it is suitable as an insulating layer for a printed circuit board. Further, since the silicone resin and the silicone rubber have a high heat resistance, a high flexibility, and a high adhesion to a heat sink or the like, it is suitable as a thermal interface material.

<Soluvent>

When dispersing the boron-nitride powder in the resin, it may be diluted with solvent as needed. The solvents are, for example, alcohols such as ethanol and isopropanol, ether alcohols such as 2-methoxy ethanol, 1-methoxy-ethanol, 2-ethoxy ethanol, 1-ethoxy-2-propanol, 2-butoxyethanol, 2-(2-methoxyethoxy)ethanol, 2-(2-ethoxyethoxy)ethanol and 2-(2-butoxyethoxy)ethanol, glycol ethers such as ethylene glycol monomethyl ether and ethylene glycol monobutyl ether, ketones such as acetone, methyl ethyl ketone, methyl isobutyl ketone and diisobutyl ketone, and hydrocarbons such as toluene and xylene. Note that, these solvents may be used alone or may be used by mixing two or more.

<Surface Contact between Boron-Nitride Powders>

Figure 2:
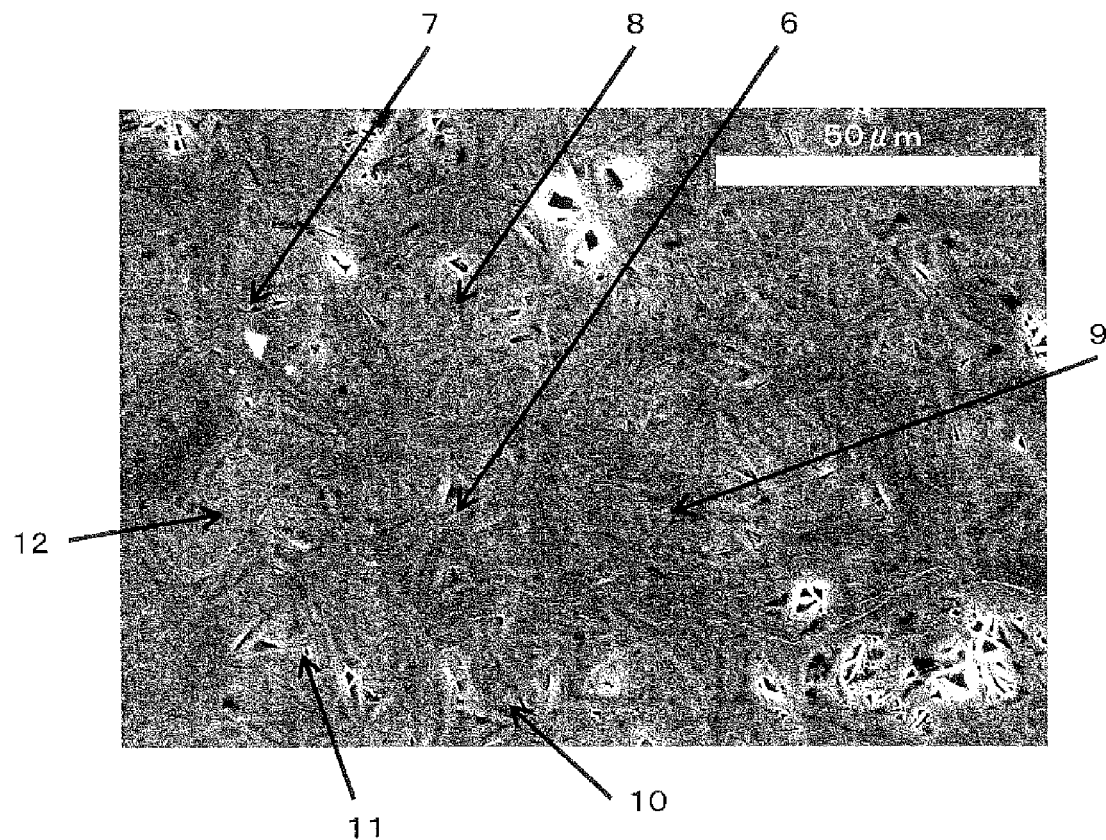
FIG. 2 is an example of a SEM photograph showing a cross-section of a resin composition of the present invention. Note that in FIG. 2, a scale bar on the upper right indicates 50 μm.

In the resin composition containing the boron-nitride powder of the present invention, the boron-nitride powders are in surface contact with each other. Surfaces where "the boron-nitride powders are in surface contact with each other" mean a flat surface and a curved surface, and "contact" means that it is difficult to distinguish outer edge portions of the boron-nitride powders from each other. It is difficult to uniquely define a degree of surface contact because it varies depending on a desired thermal conductivity. However, in order to achieve high thermal conductivity not achieved in the prior art, it is desirable that the boron-nitride powders are in surface contact with each other at plural surfaces, for example, as shown in FIG. 2 (SEM image taken by a method described below). The surface contact between the boron-nitride powders can be evaluated with the scanning electron microscope (for example, "JSM-6010LA" (manufactured by JEOL Ltd.)) by observing the surface contact between the boron-nitride powders in a cross-section of the resin composition. As a pretreatment for observation, after embedding the resin composition in the resin, the resin is processed by CP (cross-section polisher) method, and osmium coating is performed after the resin is fixed to the sample stage. The observation magnification is 1000 times.

<Mechanical Strength>

Further, when it is necessary to improve mechanical strength of the resin composition of the present invention, the resin composition can be complexed with glass cloth, glass non-woven fabric, aramid fiber non-woven fabric, liquid crystal polymer non-woven fabric or the like.

EXAMPLES

Hereinafter, the present invention will be described more specifically by examples and comparative examples.

Examples 1 to 14, Comparative Examples 1 to 11

Amorphous boron-nitride powder (Amorphous BN in Table 1) having oxygen content of 2.4%, BN purity of 96.3%, and calcium content of 67 ppm, hexagonal boron-nitride powder (Hexagonal BN in Table 1) having oxygen content of 0.1%, BN purity of 98.8%, and calcium content of 8 ppm, calcium carbonate ("PC-700" produced by SHIRAISHI KOGYO KAISHA, LTD.) which is a sintering aid, and water are mixed using a Henschel mixer and pulverized by a ball mill to obtain an aqueous slurry. Further, 0.5 parts by weight of polyvinyl alcohol resin ("Gohsenol" produced by Nippon Synthetic Chemical Industry Co., Ltd.) is added to 100 parts by weight of the aqueous slurry, and after stirring and heating at 50° C. until dissolved, the aqueous slurry is subjected to a spheroidizing treatment at drying temperature of 230° C. in a spray dryer. As a spheroidizing device which is the spray dryer, a rotary atomizer is used. After firing the resulting treated product in a batch-type high-frequency furnace, the fired product is subjected to a pulverization and classification treatment to obtain the boron-nitride powder. As shown in Table 1, by adjusting raw material mixing, ball milling condition (milling time (hr)), spray-drying condition (atomizer rotational speed (rpm)) and firing condition (firing temperature (° C.)), 25 kinds of powders A to Y shown in Table 2 (Examples) and Table 3 (Comparative Examples) are prepared. Coupling states of the primary particles of the resulting powders A to Y are measured by the scanning electron microscope as described in the above [Embodiments for carrying out Invention], and as a result, it is confirmed that the primary particles are bonded to each other in any of the boron-nitride powders.

TABLE 1

| Powder name | Mean particle diameter (μm) of raw material | | Mixing ratio (mass %) | | | | Milling time (hr) | Spray-drying condition Atomizer rotational speed (rpm) | Firing temperature (° C.) |
| --- | --- | --- | --- | --- | --- | --- | --- | --- | --- |
| | Amorphous BN | Hexagonal BN | Amorphous BN | Hexagonal BN | CaCO3 | Water | | | |
| A | 3.8 | 12.8 | 15.72 | 5.24 | 0.54 | 78.50 | 5.0 | 7000 | 1850 |
| B | 3.8 | 12.8 | 16.03 | 5.35 | 0.12 | 78.50 | 5.0 | 7000 | 1850 |
| C | 3.8 | 12.8 | 15.41 | 5.14 | 0.95 | 78.50 | 5.0 | 7000 | 1850 |
| D | 3.8 | 12.8 | 17.84 | 3.12 | 0.54 | 78.50 | 5.0 | 7000 | 1850 |
| E | 3.8 | 12.8 | 13.11 | 7.85 | 0.54 | 78.50 | 5.0 | 7000 | 1850 |
| F | 2.5 | 12.8 | 15.72 | 5.24 | 0.54 | 78.50 | 5.0 | 7000 | 1850 |
| G | 5.6 | 12.8 | 15.72 | 5.24 | 0.54 | 78.50 | 5.0 | 7000 | 1850 |
| H | 3.8 | 15.2 | 15.72 | 5.24 | 0.54 | 78.50 | 5.0 | 7000 | 1850 |
| I | 3.8 | 12.8 | 12.43 | 4.14 | 0.43 | 83.00 | 5.0 | 7000 | 1850 |
| J | 3.8 | 12.8 | 15.72 | 5.24 | 0.54 | 78.50 | 5.0 | 14000 | 1850 |
| K | 3.8 | 12.8 | 15.72 | 5.24 | 0.54 | 78.50 | 5.0 | 5000 | 1850 |
| L | 3.8 | 12.8 | 15.72 | 5.24 | 0.54 | 78.50 | 1.5 | 7000 | 1850 |

TABLE 1-continued

| Powder name | Mean particle diameter (μm) of raw material | | Mixing ratio (mass %) | | | | Milling time (hr) | Spray-drying condition Atomizer rotational speed (rpm) | Firing temperature (° C.) |
|---|---|---|---|---|---|---|---|---|---|
| | Amorphous BN | Hexagonal BN | Amorphous BN | Hexagonal BN | CaCO3 | Water | | | |
| M | 3.8 | 12.8 | 15.72 | 5.24 | 0.54 | 78.50 | 5.0 | 7000 | 2000 |
| N | 3.8 | 12.8 | 15.72 | 5.24 | 0.54 | 78.50 | 5.0 | 7000 | 1750 |
| O | 3.8 | 12.8 | 16.06 | 5.35 | 0.09 | 78.50 | 5.0 | 7000 | 1850 |
| P | 3.8 | 12.8 | 15.28 | 5.10 | 1.12 | 78.50 | 5.0 | 7000 | 1850 |
| Q | 3.8 | 12.8 | 19.25 | 1.71 | 0.54 | 78.50 | 5.0 | 7000 | 1850 |
| R | 3.8 | 12.8 | 12.01 | 8.95 | 0.54 | 78.50 | 5.0 | 7000 | 1850 |
| S | 1.8 | 12.8 | 15.72 | 5.24 | 0.54 | 78.50 | 5.0 | 7000 | 1850 |
| T | 6.2 | 12.8 | 15.72 | 5.24 | 0.54 | 78.50 | 5.0 | 7000 | 1850 |
| U | 3.8 | 17.3 | 15.72 | 5.24 | 0.54 | 78.50 | 5.0 | 7000 | 1850 |
| V | 3.8 | 12.8 | 10.97 | 3.66 | 0.37 | 85.00 | 5.0 | 7000 | 1850 |
| W | 3.8 | 12.8 | 15.72 | 5.24 | 0.54 | 78.50 | 5.0 | 16000 | 1850 |
| X | 3.8 | 12.8 | 15.72 | 5.24 | 0.54 | 78.50 | 5.0 | 4200 | 1850 |
| Y | 3.8 | 12.8 | 16.13 | 5.37 | 0.00 | 78.50 | 5.0 | 7000 | 1850 |

TABLE 2

| | | Example 1 | Example 2 | Example 3 | Example 4 | Example 5 | Example 6 | Example 7 |
|---|---|---|---|---|---|---|---|---|
| Powder name | | A | B | C | D | E | F | G |
| Calcium content | (ppm) | 2742 | 547 | 4821 | 2738 | 2739 | 2740 | 2742 |
| Porosity | (%) | 66 | 67 | 68 | 52 | 79 | 64 | 66 |
| Mean pore diameter | (μm) | 0.80 | 0.85 | 0.83 | 0.81 | 0.79 | 0.12 | 1.80 |
| Maximum pore diameter | (μm) | 5.8 | 5.6 | 5.7 | 5.9 | 6.0 | 6.1 | 5.7 |
| Mean sphericity | (—) | 0.87 | 0.85 | 0.86 | 0.87 | 0.87 | 0.88 | 0.89 |
| Mean particle diameter | (μm) | 64.1 | 65.1 | 63.9 | 64.8 | 65.9 | 65.2 | 65.3 |
| Peak intensity ratio I(002)/I(100) | (—) | 6.5 | 6.6 | 6.3 | 6.2 | 6.7 | 6.4 | 6.6 |
| Graphitization index | (—) | 2.6 | 2.4 | 2.5 | 2.6 | 2.7 | 2.8 | 2.6 |
| Elastic modulus | (MPa) | 15.1 | 14.0 | 15.8 | 15.9 | 13.1 | 16.0 | 14.9 |
| Particle strength | (MPa) | 4.0 | 3.5 | 4.8 | 4.6 | 3.4 | 4.7 | 3.4 |
| Thermal conductivity | (W/(m · K)) | 8.5 | 8.0 | 8.3 | 8.7 | 7.9 | 8.9 | 9.1 |

| | | Example 8 | Example 9 | Example 10 | Example 11 | Example 12 | Example 13 | Example 14 |
|---|---|---|---|---|---|---|---|---|
| Powder name | | H | I | J | K | L | M | N |
| Calcium content | (ppm) | 2744 | 2170 | 2737 | 2735 | 2737 | 2745 | 2744 |
| Porosity | (%) | 65 | 65 | 66 | 65 | 64 | 67 | 66 |
| Mean pore diameter | (μm) | 0.82 | 0.83 | 0.82 | 0.81 | 0.80 | 0.77 | 0.78 |
| Maximum pore diameter | (μm) | 9.1 | 5.6 | 5.9 | 5.7 | 6.1 | 6.0 | 5.8 |
| Mean sphericity | (—) | 0.88 | 0.73 | 0.90 | 0.86 | 0.85 | 0.89 | 0.87 |
| Mean particle diameter | (μm) | 63.5 | 64.5 | 23.7 | 96.8 | 65.9 | 67.1 | 67.8 |
| Peak intensity ratio I(002)/I(100) | (—) | 6.5 | 6.8 | 6.6 | 6.1 | 8.8 | 6.4 | 6.5 |
| Graphitization index | (—) | 2.7 | 2.5 | 2.5 | 2.4 | 2.6 | 1.8 | 3.8 |
| Elastic modulus | (MPa) | 14.3 | 15.0 | 16.3 | 13.9 | 14.1 | 15.6 | 14.5 |
| Particle strength | (MPa) | 3.4 | 3.8 | 3.9 | 3.3 | 4.1 | 3.5 | 3.7 |
| Thermal conductivity | (W/(m · K)) | 8.9 | 7.7 | 7.6 | 8.9 | 7.2 | 7.4 | 7.3 |

TABLE 3

| | | Comparative Example 1 | Comparative Example 2 | Comparative Example 3 | Comparative Example 4 | Comparative Example 5 | Comparative Example 6 |
|---|---|---|---|---|---|---|---|
| Powder name | | O | P | Q | R | S | T |
| Calcium content | (ppm) | 446 | 5369 | 2761 | 2760 | 2755 | 2738 |
| Porosity | (%) | 66 | 66 | 45 | 84 | 67 | 68 |
| Mean pore diameter | (μm) | 0.80 | 0.82 | 0.77 | 0.84 | 0.05 | 2.30 |
| Maximum pore diameter | (μm) | 5.8 | 5.9 | 5.6 | 5.6 | 5.7 | 6.0 |
| Mean sphericity | (—) | 0.87 | 0.85 | 0.91 | 0.88 | 0.89 | 0.87 |
| Mean particle diameter | (μm) | 64.1 | 66.2 | 65.3 | 63.9 | 66.8 | 67.1 |
| Peak intensity ratio I(002)/I(100) | (—) | 6.5 | 6.8 | 6.2 | 6.3 | 6.9 | 7.0 |
| Graphitization index | (—) | 2.6 | 2.5 | 2.5 | 2.4 | 2.6 | 2.7 |
| Elastic modulus | (MPa) | 3.5 | 39.0 | 41.0 | 4.7 | 43.6 | 4.3 |
| Particle strength | (MPa) | 1.1 | 5.0 | 5.1 | 1.0 | 4.9 | 1.2 |

TABLE 3-continued

| | | Comparative Example 7 | Comparative Example 8 | Comparative Example 9 | Comparative Example 10 | Comparative Example 11 |
|---|---|---|---|---|---|---|
| Thermal conductivity | (W/(m·K)) | — | 3.1 | 3.2 | — | 3.0 | — |
| Remarks | | unfillable | — | — | unfillable | — | unfillable |
| Powder name | | U | V | W | X | Y |
| Calcium content | (ppm) | 2735 | 1867 | 2750 | 2749 | 38 |
| Porosity | (%) | 66 | 65 | 67 | 64 | 65 |
| Mean pore diameter | (μm) | 0.79 | 0.81 | 0.80 | 0.83 | 0.83 |
| Maximum pore diameter | (μm) | 11.2 | 5.7 | 5.6 | 6.2 | 5.5 |
| Mean sphericity | (—) | 0.86 | 0.65 | 0.90 | 0.89 | 0.82 |
| Mean particle diameter | (μm) | 65.5 | 64.7 | 17.9 | 104.6 | 59.8 |
| Peak intensity ratio I(002)/I(100) | (—) | 6.6 | 6.7 | 6.8 | 6.4 | 6.5 |
| Graphitization index | (—) | 2.8 | 2.9 | 2.7 | 2.6 | 3.1 |
| Elastic modulus | (MPa) | 4.0 | 15.0 | 21.1 | 3.8 | 2.1 |
| Particle strength | (MPa) | 0.9 | 3.8 | 4.0 | 0.8 | 0.5 |
| Thermal conductivity | (W/(m·K)) | — | — | 3.0 | — | — |
| Remarks | | unfillable | unfillable | — | unfillable | unfillable |

<Filling in Resin>

In order to evaluate properties of the resulting boron-nitride powders A to Y as fillers in the resin, each of the boron-nitride powders is mixed with the epoxy resin ("Epikote 807" produced by Mitsubishi Chemical Corporation) and the curing agent ("Aku-Mex H-84B" produced by Nihon Gosei Kako Co., Ltd.) so that the boron-nitride powder is 60 vol %. After the mixed material (mixture) is coated onto a PET sheet so as to have a thickness of 1.0 mm, it is vacuum degassed under 500 Pa for 10 minutes. Then, it is heated and pressurized for 60 minutes under conditions of temperature 150° C., pressure 160 kg/cm$^2$, to be a sheet of 0.5 mm in thickness. Note that, when the mixed slurry has poor fluidity and cannot be coated, it is described as "unfillable" in Table 3. In Table 3, indication "–" in a row of thermal conductivity means that it is not possible to measure the thermal conductivity because it is unfillable.

The particle strength of the resulting boron-nitride powder and the thermal conductivity of the sheet are evaluated according to the methods shown below. The results are shown in Table 2 (Example) and Table 3 (Comparative Example).

<Evaluation Method of Particle Strength>

It is measured in accordance with JIS R 1639-5. As a measuring device, the micro-compression tester ("MCT-W500" manufactured by SHIMADZU CORPORATION) is used, and the test force—displacement curve is determined. The particle strength ($\sigma$: MPa) is calculated using a formula $\sigma = \alpha \times P/(\pi \times d^2)$ from the particle diameter (d: mm), the crush test force (P: N) and a dimensionless number ($\alpha=2.48$) which varies depending on a position in the particle.

<Evaluation Method of Thermal Conductivity>

Thermal conductivity (H: W/(m·K)) is calculated from thermal diffusivity (A: m$^2$/sec), density (B: kg/m$^3$) and specific heat capacity (C: J/(kg·K)), as H=A×B×C. The thermal diffusivity is determined by a laser flash method, after processing the sheet to have widths of 10 nun x 10 mm, and thick of 0.5 mm as a measurement sample. As a measuring device, a xenon flash analyzer ("LFA447 Nano-Flash" manufactured by NETZSCH-Gerätebau GmbH) is used. Specific gravity is determined using the Archimedes method. The specific heat capacity is determined using DSC ("Thermo plus Evo DSC8230" manufactured by Rigaku Corporation). Note that, it is evaluated to have excellent (high) thermal conductivity when the thermal conductivity is 7 W/(m·K) or more.

Further, the calcium content, porosity, mean pore diameter, maximum pore diameter, mean sphericity, mean particle diameter, peak intensity ratio, graphitization index and elastic modulus of the boron-nitride particles in Examples 1 to 14 and Comparative Examples 1 to 10 (Powders A to X) are measured and evaluated as described in the above [Embodiments for carrying out Invention].

As is apparent from comparison of Examples and Comparative Examples, the boron-nitride powder of the present invention shows a relatively high particle strength and low elastic modulus. Since the boron-nitride powder of the present invention has a relatively high particle strength as described above, it can withstand shear stress of kneading at the time of being filled in the resin and compressive stress at the time of surface contact between the boron-nitride particles, and further, since it has a low elastic modulus, it is possible to obtain sufficient surface contact between the boron-nitride particles. Therefore, the resin composition containing the boron-nitride powder of the present invention can obtain high thermal conductivity not achieved in the prior art.

INDUSTRIAL APPLICABILITY

The boron-nitride powder of the present invention is used as the filler in the resin. Further, the resin composition containing the boron-nitride powder of the present invention is used as the thermal interface material or insulating layer for the printed circuit board.

REFERENCE SIGNS LIST

1: inter-particle void
2: intra-particle void
3: total pore volume
4: cumulative pore volume of inter-particle voids
5: $V_g$=cumulative pore volume of intra-particle voids=value obtained by subtracting cumulative pore volume of inter-particle voids from total pore volume
6: boron-nitride particle 7 to 12: boron-nitride particles in surface contact with boron nitride particle 6

The invention claimed is:

1. A boron-nitride powder, containing boron-nitride particles each composed of hexagonal boron-nitride primary particles joined together, which is an aggregate of the boron-nitride particles, wherein the boron-nitride powder has a mean sphericity of 0.70 or more, a mean particle diameter of 20 to 100 μm, a porosity of 50 to 80%, a mean pore diameter of 0.10 to 2.0 μm, a maximum pore diameter of 10 μm or less, and a calcium content of 500 to 5,000 ppm.

2. The boron-nitride powder according to claim 1, wherein a graphitization index measured by powder X-ray diffraction method is 1.6 to 4.0, and a peak intensity ratio I(002)/I(100) of (002) plane to (100) plane is 9.0 or less.

3. The boron-nitride powder according to claim 1, wherein amorphous boron-nitride having a mean particle diameter of 2 to 6 μm and the hexagonal boron-nitride having a mean particle diameter of 8 to 16 μm are used as raw materials, and a mixing ratio thereof, that is, the ratio of the amorphous boron-nitride to the hexagonal boron-nitride is 60:40 to 90:10 on a mass basis.

4. A resin composition characterized by containing a resin and the boron-nitride powder according to claim 1.

5. The resin composition according to claim 4, wherein an elastic modulus of the boron-nitride particles is 5 to 35 MPa, and the boron-nitride particles are in surface contact with each other.

6. A resin composition containing a resin and the boron-nitride powder according to claim 2.

7. A resin composition containing a resin and the boron-nitride powder according to claim 3.

8. The resin composition according to claim 6, wherein an elastic modulus of the boron-nitride particles is 5 to 35 MPa, and the boron-nitride particles are in surface contact with each other.

9. The resin composition according to claim 7, wherein an elastic modulus of the boron-nitride particles is 5 to 35 MPa, and the boron-nitride particles are in surface contact with each other.

* * * * *